United States Patent [19]

Ogawa et al.

[11] Patent Number: 5,125,188
[45] Date of Patent: Jun. 30, 1992

[54] GRINDING WHEEL HAVING GRINDING MONITORING AND AUTOMATIC WHEEL BALANCE CONTROL FUNCTIONS

[75] Inventors: Koji Ogawa, Nagoya; Akira Nagata, Tsu; Koji Inoue, Nagoya, all of Japan

[73] Assignee: Noritake Co., Ltd., Nagoya, Japan

[21] Appl. No.: 600,913

[22] Filed: Oct. 22, 1990

[30] Foreign Application Priority Data

May 30, 1990 [JP] Japan .................. 2-140179

[51] Int. Cl.⁵ .............................. B24B 49/00
[52] U.S. Cl. .................. 51/165.73; 51/169; 51/165.87; 74/573 R; 74/574
[58] Field of Search ........... 51/169, 165.73, 165.87, 51/165 R; 74/573 R, 574; 73/66, 468, 470

[56] References Cited

U.S. PATENT DOCUMENTS

| | | |
|---|---|---|
| 3,277,741 | 10/1966 | Kaliszer et al. |
| 3,698,263 | 10/1972 | Ito .................. 51/169 |
| 4,438,598 | 3/1984 | Wohlmuth ........... 51/165.73 |
| 4,864,895 | 9/1989 | Frank . |

FOREIGN PATENT DOCUMENTS

| | | |
|---|---|---|
| 2327045 | 7/1978 | Fed. Rep. of Germany . |
| 2840236 | 3/1980 | Fed. Rep. of Germany . |
| 2945631A1 | 5/1981 | Fed. Rep. of Germany . |
| 59-155642 | 9/1984 | Japan . |
| 60-259927 | 12/1985 | Japan . |
| 61-265269 | 11/1986 | Japan . |
| 64-278 | 1/1989 | Japan . |
| 1-289660 | 11/1989 | Japan . |
| 0372468 | 5/1973 | U.S.S.R. .................. 51/169 |
| 0568538 | 8/1977 | U.S.S.R. .................. 51/165.73 |
| 0729458 | 4/1980 | U.S.S.R. .................. 51/169 |
| 0957577 | 5/1964 | United Kingdom .............. 51/169 |

Primary Examiner—Roscoe V. Parker
Attorney, Agent, or Firm—Oliff & Berridge

[57] ABSTRACT

A grinding wheel for grinding a workpiece, including a core portion connected to a drive shaft, and an abrasive portion fixed to an outer circumferential surface of the core portion for grinding the workpiece. The grinding wheel further includes at least one balancing member which is movable in a circumferential direction of the wheel, a driver device for moving the balancing member(s) in the circumferential direction so as to change an angular position of each balancing member, a signal receiving device for receiving a control signal for balancing the wheel, and a driver control circuit for operating the driver device for moving the balancing member(s) so as to balance the wheel, according to the control signal received by the signal receiving device. The above-indicated at least one balancing member, driver device, signal receiving device and driver control circuit are all disposed within the core portion of the wheel.

25 Claims, 14 Drawing Sheets

FIG. 3
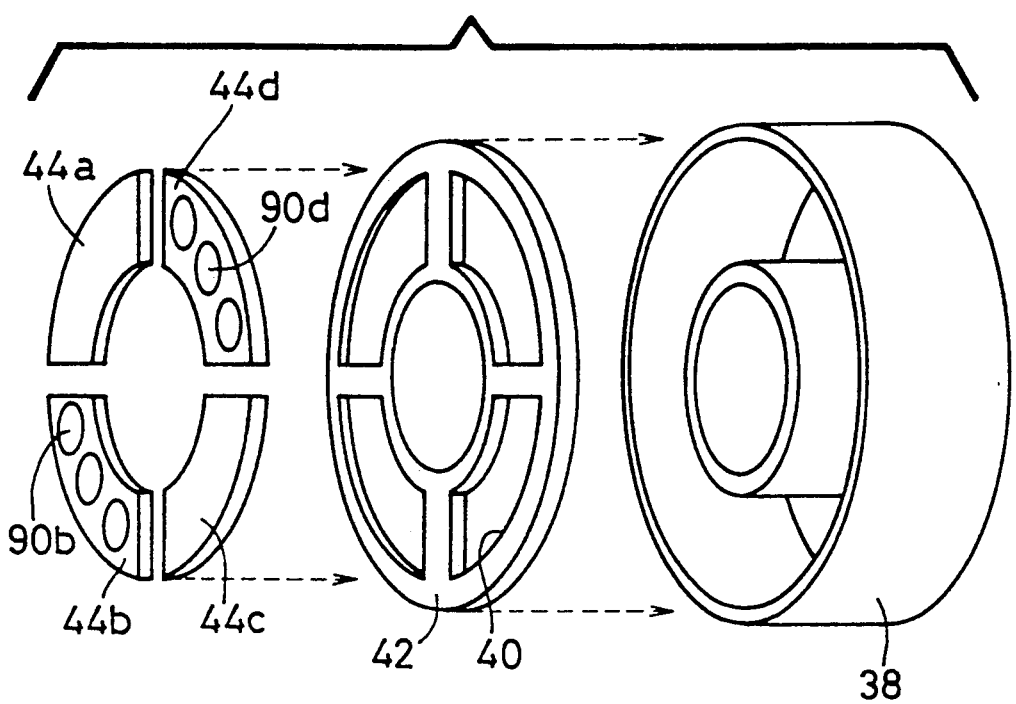
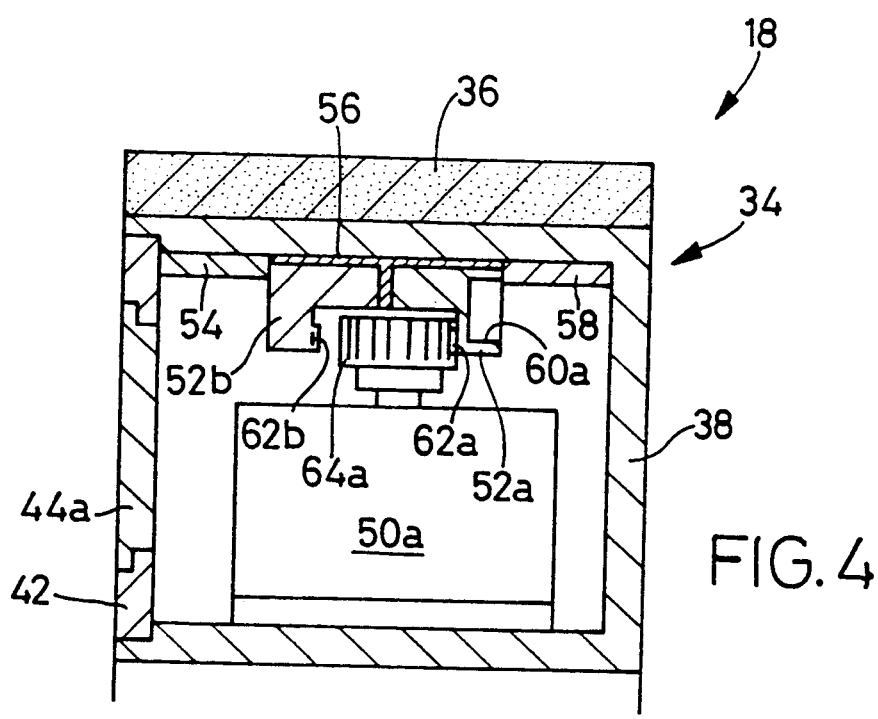
FIG. 4

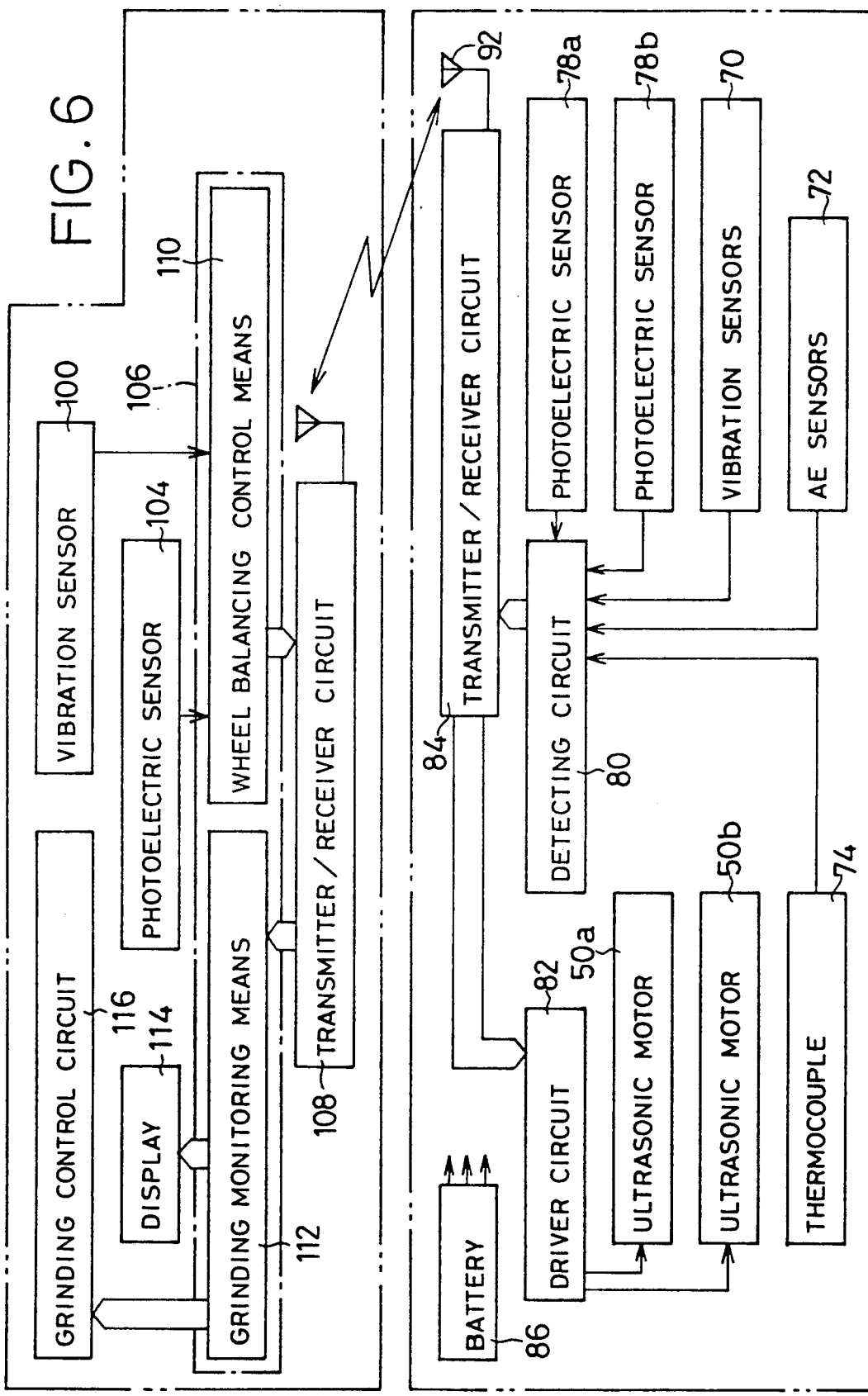

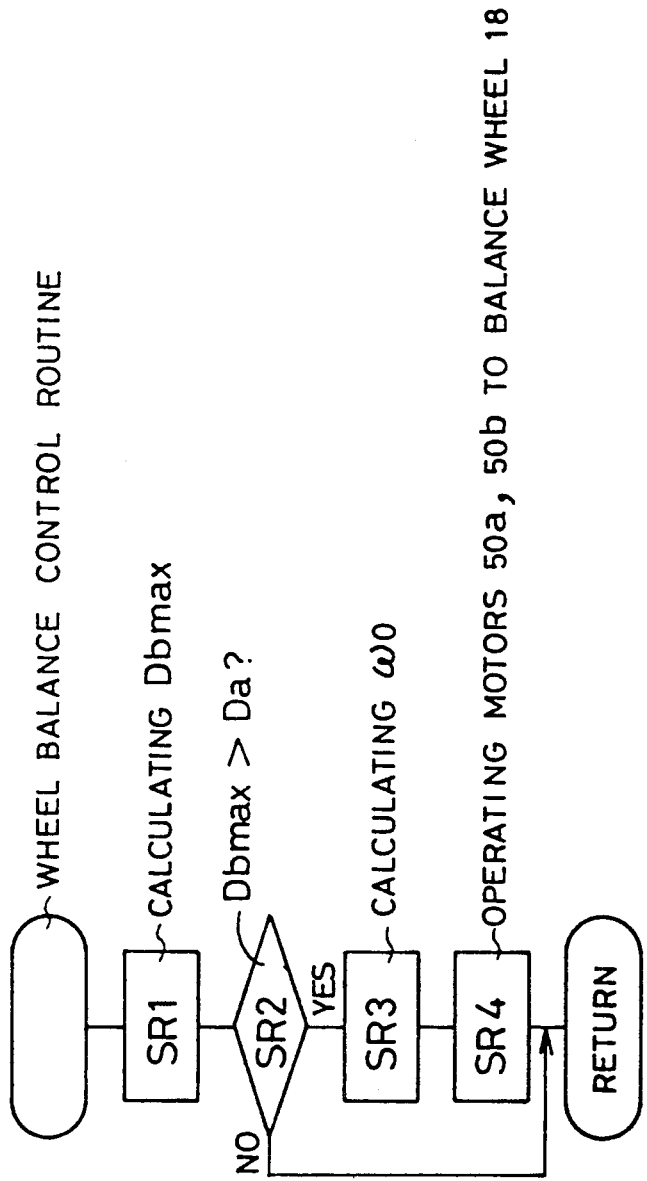

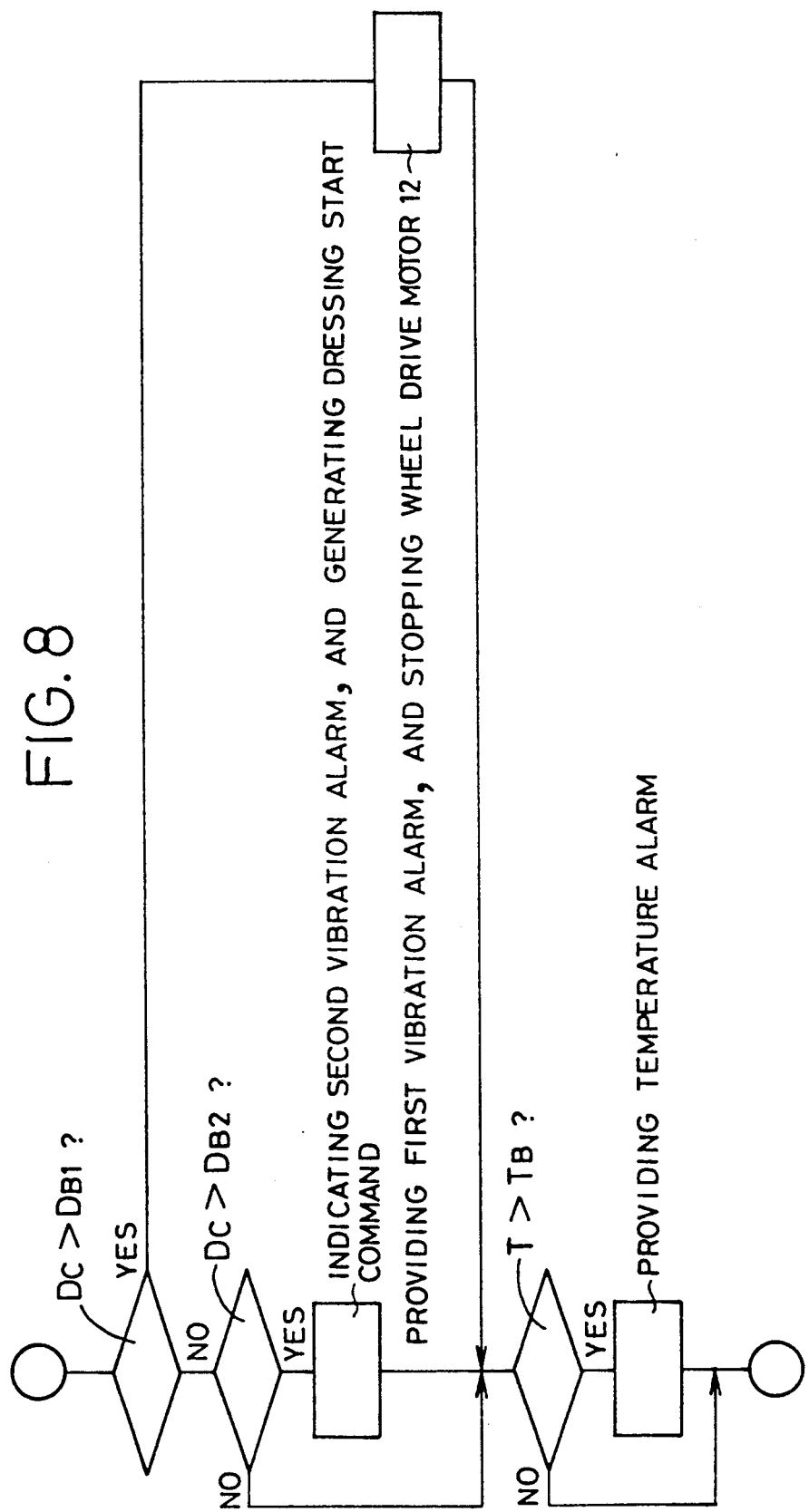

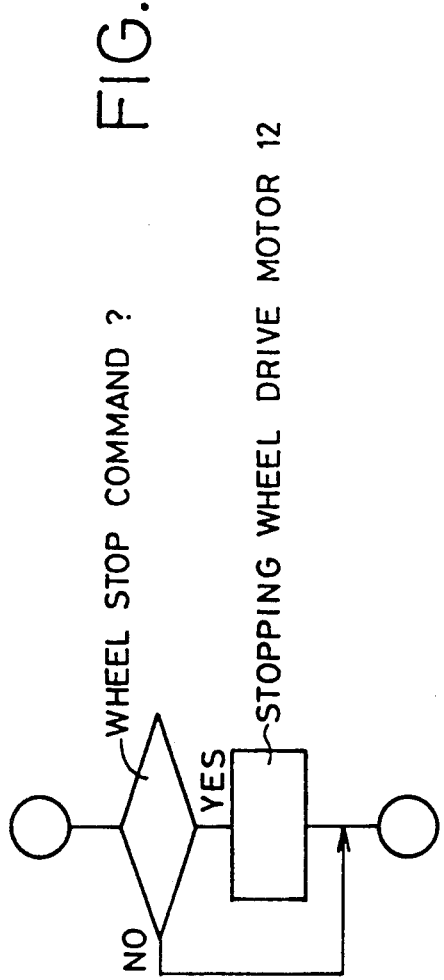

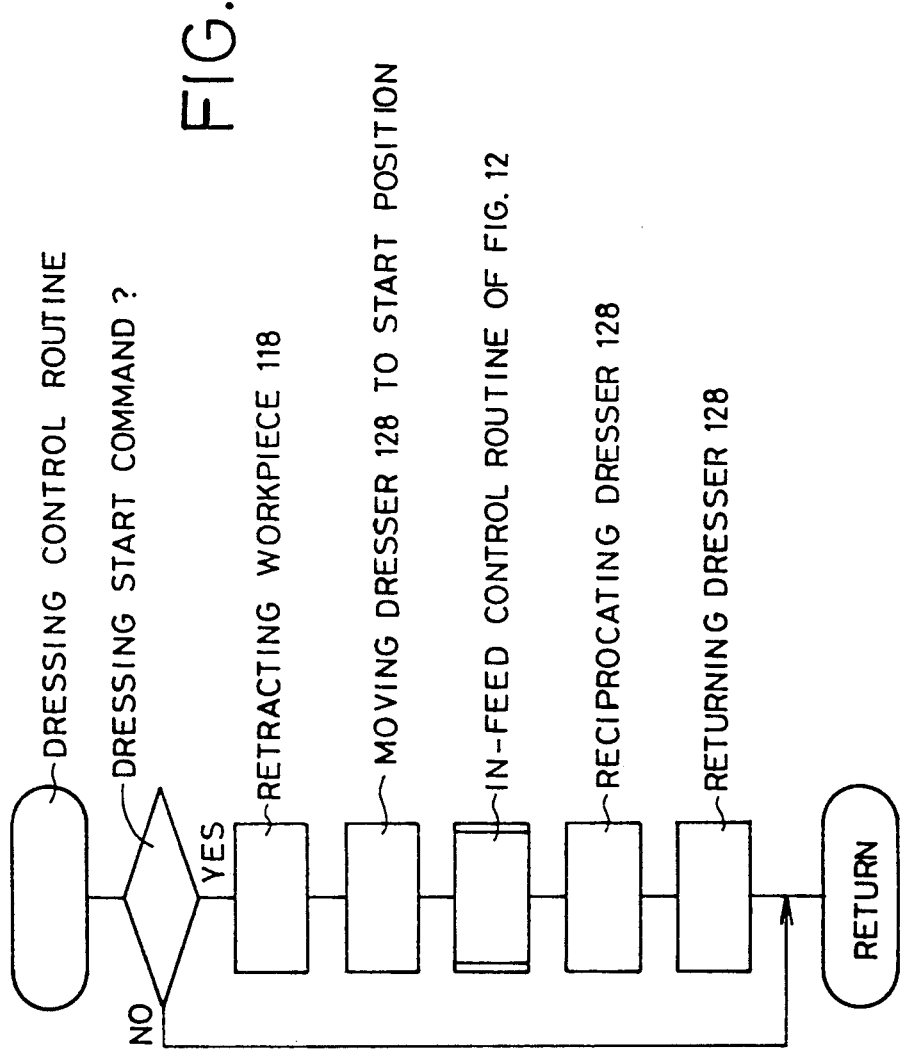

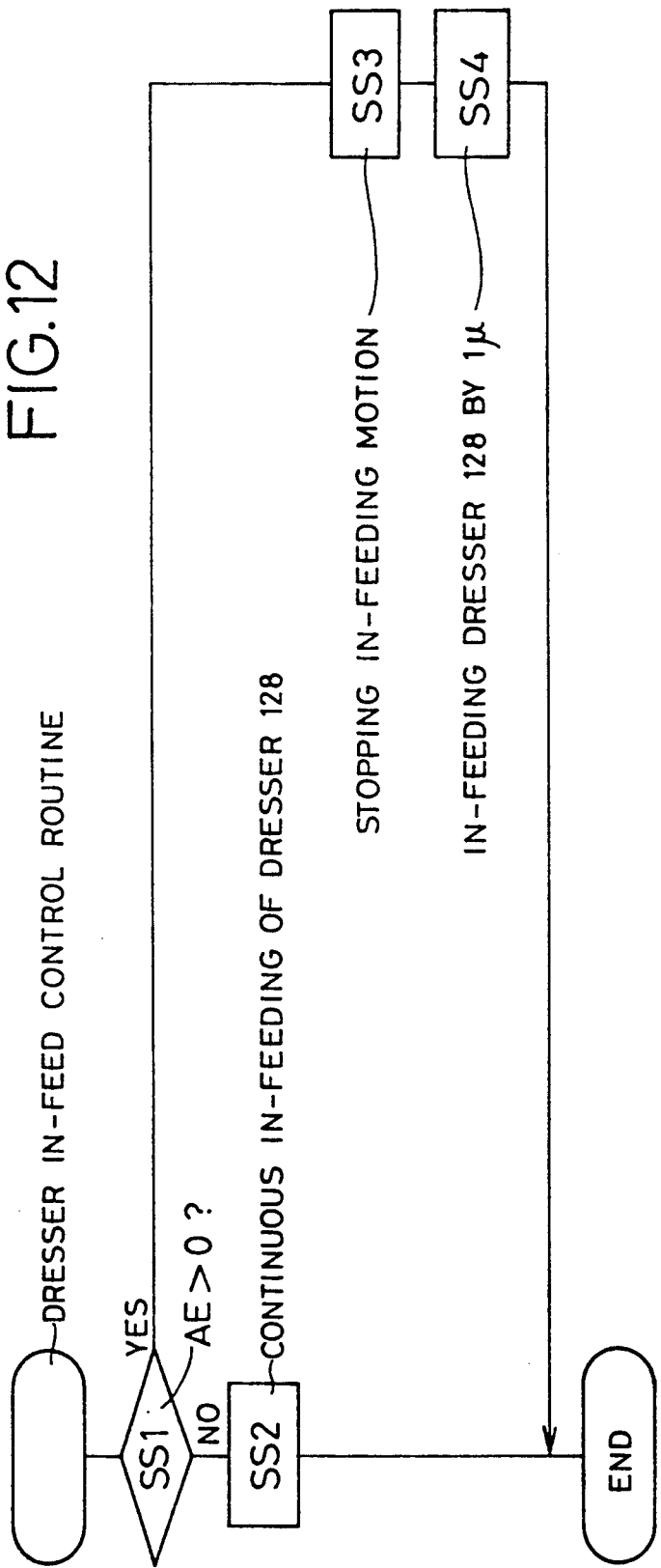

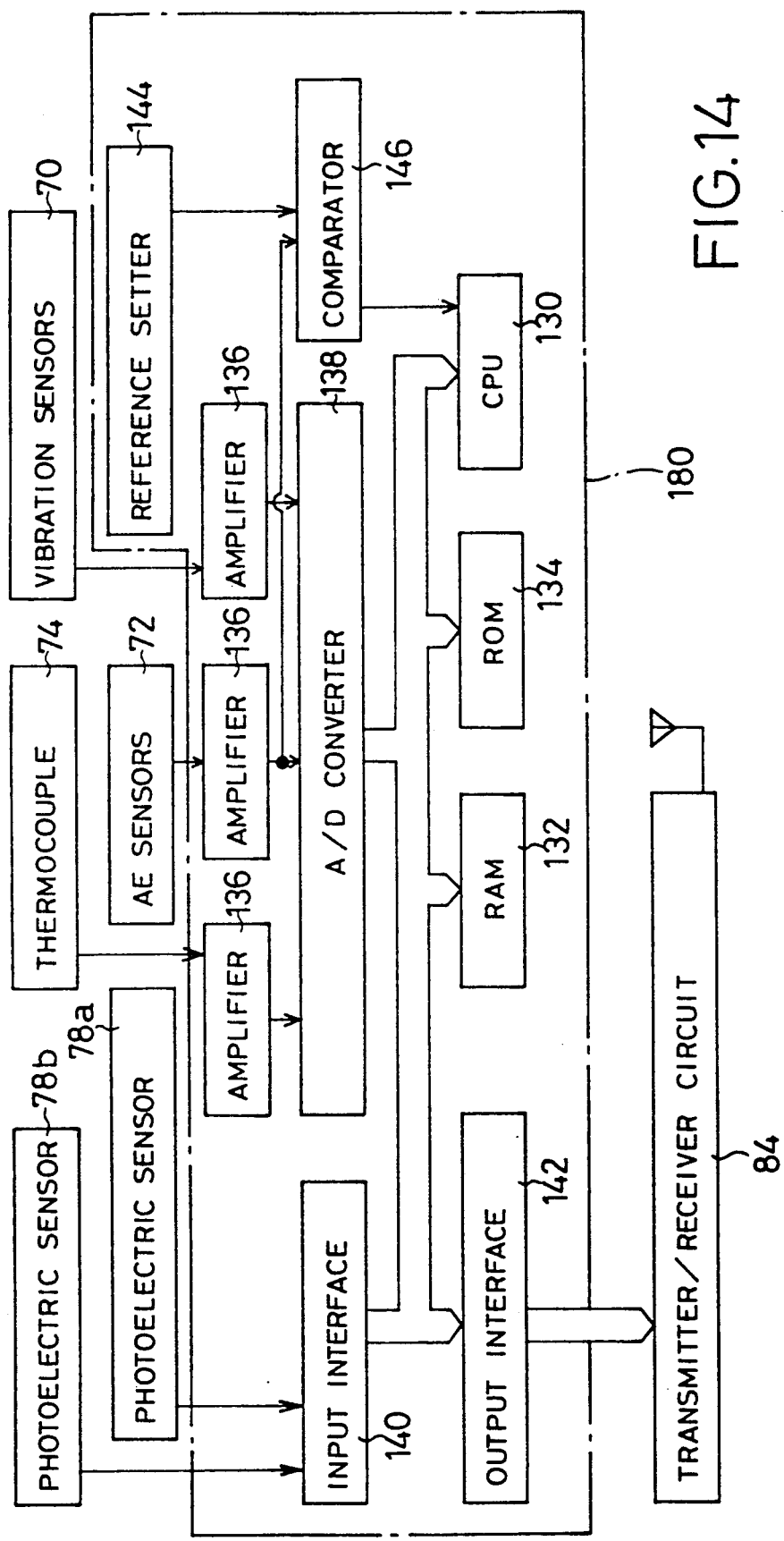

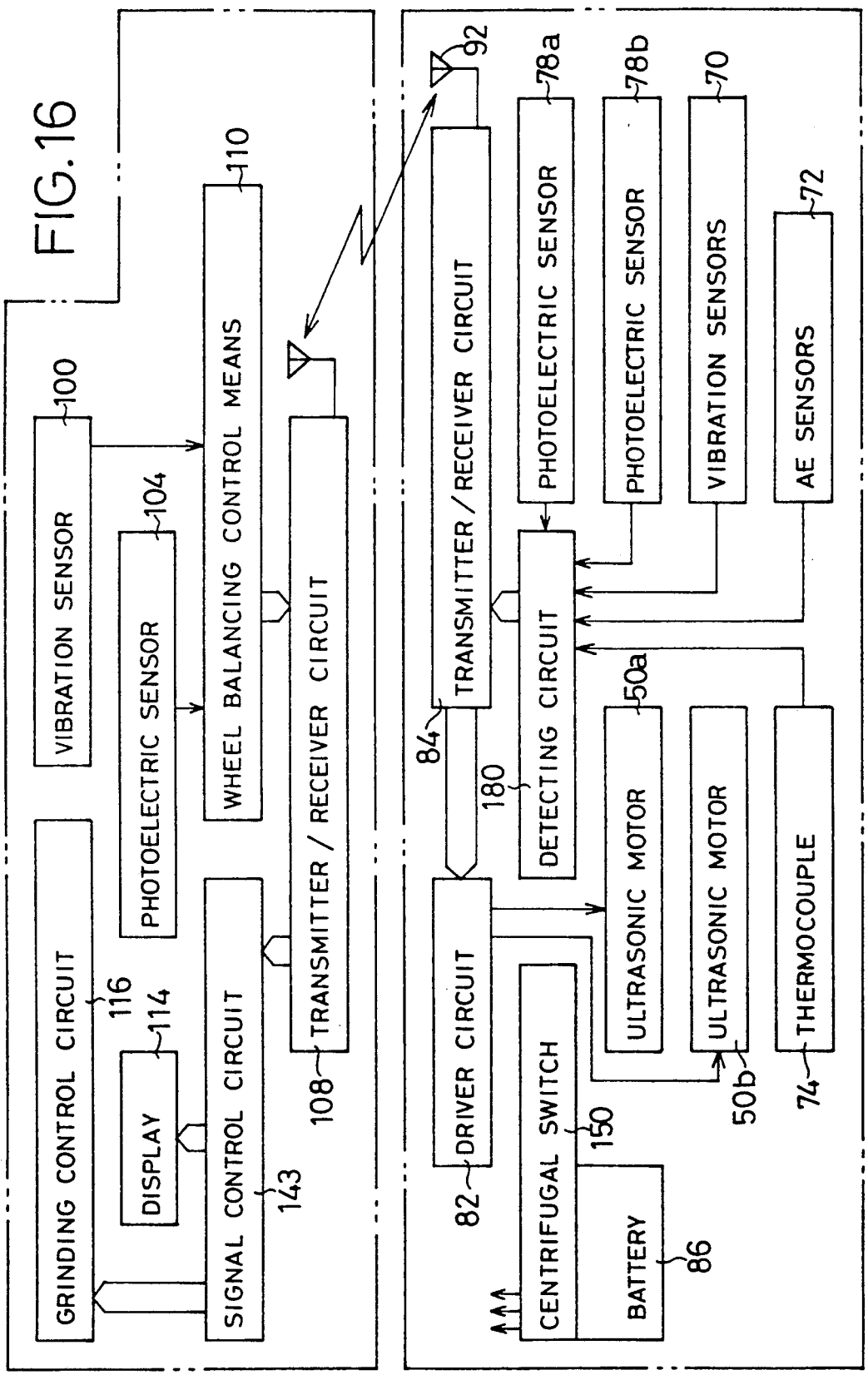

GRINDING WHEEL HAVING GRINDING MONITORING AND AUTOMATIC WHEEL BALANCE CONTROL FUNCTIONS

BACKGROUND OF THE INVENTION

1. Field of the Invention

The present invention relates generally to a grinding wheel which is rotated by a drive shaft (wheel spindle) to grind a workpiece, and more particularly to such a grinding wheel that has a function of monitoring its grinding conditions and a function of automatically establishing a dynamic balance thereof.

2. Discussion of the Prior Art

A known grinding machine has grinding wheel which includes a cylindrical core portion which is mounted on a drive shaft, and an annular abrasive portion fixed to the outer circumferential surface of the core portion. The grinding wheel is adapted to grind a workpiece in contact with the abrasive portion while the wheel is rotated by the drive shaft. Generally, the grinding wheel is required to maintain the dynamic balance. To this end, it is necessary to monitor the state of the wheel during its grinding operation. When the abrasive portion of the wheel is made of highly durable abrasive grains, such as diamond or CBN (cubic boron nitride), which permit highly efficient grinding, the grinding wheel tends to suffer from imbalance, and chattering, burning or cracking phenomena, which occur due to relatively high hardness of the abrasive grains. Accordingly, it is required to carefully monitor the grinding wheel for promptly dealing with such abnormal conditions as described above.

Conventionally, there is proposed a device for eliminating dynamic imbalance of the rotating grinding wheel, by providing the wheel with a balancing member or weight an automatically calculating the amount of movement of the balancing member along the circumference of the wheel to establish the dynamic balance, and displaying the calculated amount, as disclosed in laid-open publication No. 60-259927 of unexamined Japanese Patent Application. However, since the imbalance of the wheel must be rectified by manually moving the balancing member after the wheel is stopped, it requires a lot of time to balance the wheel, and the operating efficiency of the grinding machine is accordingly lowered. Further, since the wheel balancing cannot be effected while the wheel is rotating, the unbalanced rotating wheel would have excessive wear in local portions on the outer circumferential surface thereof, which leads to poor grinding accuracy and lowered durability of the wheel.

It is also proposed to provide an acoustic-wave sensor (AE sensor) for detecting high-frequency ultrasonic vibrations (acoustic or elastic emissions) which are generated by the grinding wheel, as disclosed in Publication No. 64-278 of examined Japanese Utility Model Application. The disclosed AE sensor is fixed to a stationary member of the grinding machine, for detecting vibrations which are transmitted through a liquid that is jetted on a side surface of the abrasive portion of the grinding wheel. In this case, the vibrations detected by the sensor may be affected by the conditions in which the liquid is jetted against the abrasive portion, or by gases which are present in the liquid.

Conventionally, a temperature sensor is embedded in the workpiece to be ground by the grinding wheel, so as to measure a temperature at the grinding surface of the wheel during the grinding operation. However, the known sensor is not able to accurately measure the wheel temperature since the workpiece having the sensor is moved relative to the rotating wheel during the grinding operation. If the vibrations or the wheel temperature cannot be accurately detected as in the conventional grinding machine, it is difficult to determine abnormalities in the grinding, resulting in increased unacceptance or reject ratio of the ground workpieces. Further, the above manner of measuring the wheel temperature is restricted by the manner of grinding and the configuration of the workpiece. For example, it is difficult to embed the temperature sensor in a cylindrical workpiece which is rotated during the grinding operation.

SUMMARY OF THE INVENTION

It is therefore a first object of the invention to provide a grinding wheel which is automatically dynamically balanced, assuring excellent grinding accuracy and improved durability.

It is a second object of the invention to provide a grinding wheel which is capable of accurately detecting vibrations thereof which occur during its grinding operation, so as to monitor the grinding wheel for abnormal conditions and deal with the detected abnormalities, to lower the reject ratio of the ground workpieces.

It is a third object of the invention to provide a grinding wheel which is capable of accurately measuring a temperature at the grinding surface thereof, without being affected by the manner of grinding or the configuration of the workpiece to be ground, so as to lower the reject ratio of the ground workpieces.

The first object indicated above may be attained according to one aspect of the invention, which provides a grinding wheel for grinding a workpiece, comprising (a) a core portion connected to a drive shaft, (b) an abrasive portion fixed to an outer circumferential surface of the core portion for grinding the workpiece, (c) at least one balancing member disposed in the core portion such that each balancing member is movable in a circumferential direction of the wheel, (d) drive means disposed in the core portion, for moving the balancing member(s) in the circumferential direction so as to change an angular position of each balancing member, (e) signal receiving means disposed in the core portion, for receiving a control signal for balancing the grinding wheel, the control signal being transmitted in the air from outside the wheel, and (f) a driver control circuit disposed in the core portion, for operating the drive means for moving the balancing member(s) so as to balance the grinding wheel, according to the control signal received by the signal receiving means.

In the grinding wheel constructed as described above, all of the balancing member or members, drive means for moving the balancing member(s), signal receiving means for receiving the control signal transmitted in the air, and the driver control circuit for operating the driver means according to the control signal are disposed within the core portion. In operation, the driver means is driven by the driver control circuit to move the balancing member(s) in the circumferential direction, according to the control signal received by the signal receiving means. In this arrangement, the imbalance of the wheel can be automatically rectified without stopping the rotating wheel, assuring a relatively high operating efficiency of a grinding machine using the present grinding wheel. Further since the wheel balancing can be effected while the wheel is rotating, the wheel is free from the excessive local wear on its outer circumferential surface, which would result from a delay in re-establishing the balance of the unbalanced rotating wheel. Thus, the present grinding wheel permits a highly accurate grinding operation, and assures improved durability.

The second object may be attained according to another aspect of the invention, which provides a grinding wheel for grinding a workpiece, comprising (a) a core portion connected to a drive shaft, (b) an abrasive portion fixed to an outer circumferential surface of the core portion for grinding the workpiece, (c) vibration detecting means disposed in the core portion, for detecting vibrations including ultrasonic vibrations at a portion close to the abrasive portion, the vibrations occurring during a grinding operation of the abrasive portion, so as to produce a vibration signal indicative of the vibrations, and (d) vibration signal transmitting means disposed in the core portion, for transmitting in the air the vibration signal from the vibration detecting means, so as to monitor a current grinding condition of the wheel.

In the grinding wheel constructed as described above, the vibrations which occur during grinding are detected by the vibration detecting means disposed in the core portion, so that the detecting means produces the vibration signal representative of the detected vibrations. The vibration signal from the detecting means is transmitted in the air by the vibration signal transmitting means. Accordingly, a grinding machine using the present grinding wheel is capable of accurately detecting the vibrations of the wheel, without being affected by the conditions in which a conventionally used liquid is jetted against the abrasive for detecting the wheel vibrations, or gases which are present in the liquid. This permits the grinding machine to properly deal with abnormal vibrations during the grinding operation, thereby lowering the unacceptance or reject ratio of the ground workpieces.

The third object may be attained according to still another aspect of the invention, which provides a grinding wheel for grinding a workpiece, comprising (a) a core portion connected to a drive shaft, (b) an abrasive portion fixed to an outer circumferential surface of the core portion for grinding the workpiece, (c) temperature sensing means disposed in the core portion, for sensing a wheel temperature at a portion close to the abrasive portion, curing a grinding operation of the abrasive portion, so as to produce a temperature signal indicative of the wheel temperature, and (d) temperature signal transmitting means disposed in the core portion, for transmitting in the air the temperature signal from the temperature sensing means, so as to monitor a current grinding condition of the wheel.

In the grinding wheel constructed as described above, the wheel temperature in the vicinity of the grinding surface is measured by the temperature sensing means disposed in the core portion, so that the sensing means produces the temperature signal representative of the wheel temperature. Then, the temperature signal from the sensing means is transmitted in the air by the temperature signal transmitting means. Accordingly, a grinding machine using the present grinding wheel is capable of accurately sensing the wheel temperature, irrespective of the movement of the workpiece relative to the abrasive portion of the wheel. This permits the grinding machine to properly deal with an abnormal wheel temperature, thereby lowering the reject ratio of the ground workpieces. Since the temperature sensing means is disposed in the core portion of the wheel, the temperature measurement is not restricted by the manner of grinding or the configuration of the workpiece.

BRIEF DESCRIPTION OF THE DRAWINGS

The above and optional objects, features and advantages will be better understood by reading the following detailed description of some presently preferred embodiments of the invention, when considered in conjunction with the accompanying drawings, in which:

FIG. 3 is a perspective exploded view showing constituent members of a core portion of the wheel of FIG. 2;

FIG. 4 is a cross sectional view taken along line 4—4 of FIG. 2;

FIG. 6 is a block diagram showing an electrical control arrangement of the grinding machine of FIG. 1;

FIG. 7 is a flow chart illustrating an operation of an automatic wheel balance control device shown in FIG. 6;

FIGS. 8 and 9 are views explaining respective operations of grinding monitoring means shown in FIG. 6;

FIGS. 10 through 13 are flow charts illustrating operations of a grinding control circuit indicated in FIGS. 1 and 6;

FIG. 14 is a block diagram showing a detecting circuit incorporated in a grinding wheel according to a modified embodiment of the present invention;

FIGS. 15 and 16 are views associated with the embodiment of FIG. 14, which correspond to those of FIGS. 5 and 6, respectively;

DETAILED DESCRIPTION OF THE PREFERRED EMBODIMENTS

Figure 1:
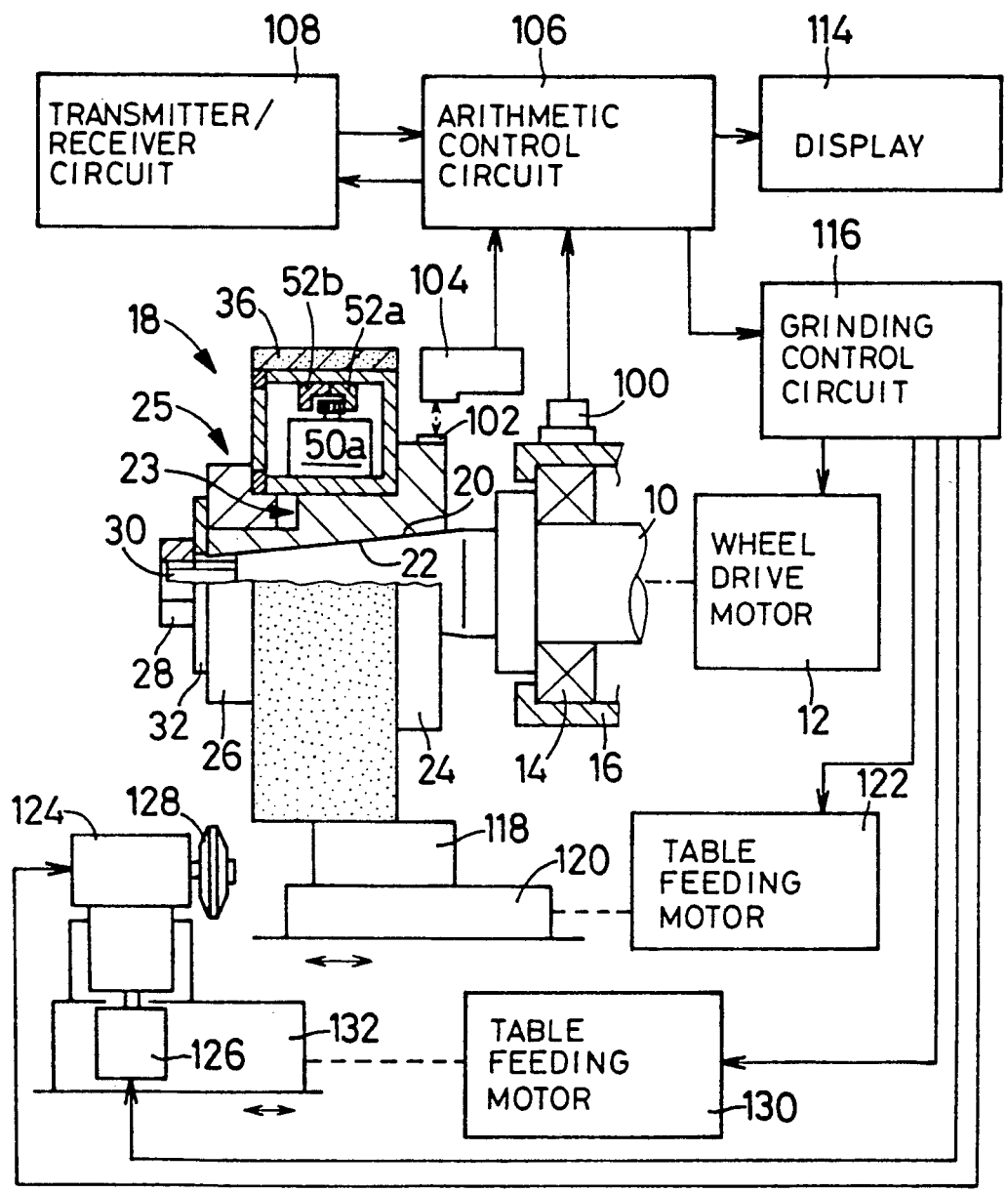
FIG. 1 is a schematic view showing an arrangement of a grinding machine which uses a grinding wheel constructed according to one embodiment of the present invention.

Referring first to FIG. 1, the grinding machine has a drive shaft 10 for rotating a grinding wheel 18 about its axis. The drive shaft 10 is operatively connected to a wheel drive motor 12 and is rotatably supported by a machine frame 16 via bearings 14 (only one of which is shown in FIG. 1). The grinding wheel 18 is removably mounted on the drive shaft 10. More specifically, the drive shaft 10 has a tapered surface 20 formed at one axial end portion thereof. On the other hand, the grinding machine has a first and a second adaptor 23, 25 having respective flanges 24, 26. The first adaptor 23 has a tapered bore 22 which follows the shape of the tapered surface 20 of the drive shaft 10, so that the first adaptor 23 is fitted snugly on the axial end portion of the drive shaft 10. The second adaptor 25 is fitted on a small-diameter portion of the first adaptor 23 remote from the flange 24, such that the grinding wheel 18 is interposed between the flanges 24, 26 of the two adaptors 23, 25. In this condition, a nut 28 is fastened to an externally threaded end portion 30 formed at the distal end of the drive shaft 10 with a washer 32 being interposed between the nut 28 and the second adaptor 25, so as to tighten the two flanges 24, 26 firmly enough to hold the grinding wheel 18. Thus, the grinding wheel 18 is removably connected to the driving shaft 10.

Figure 2:
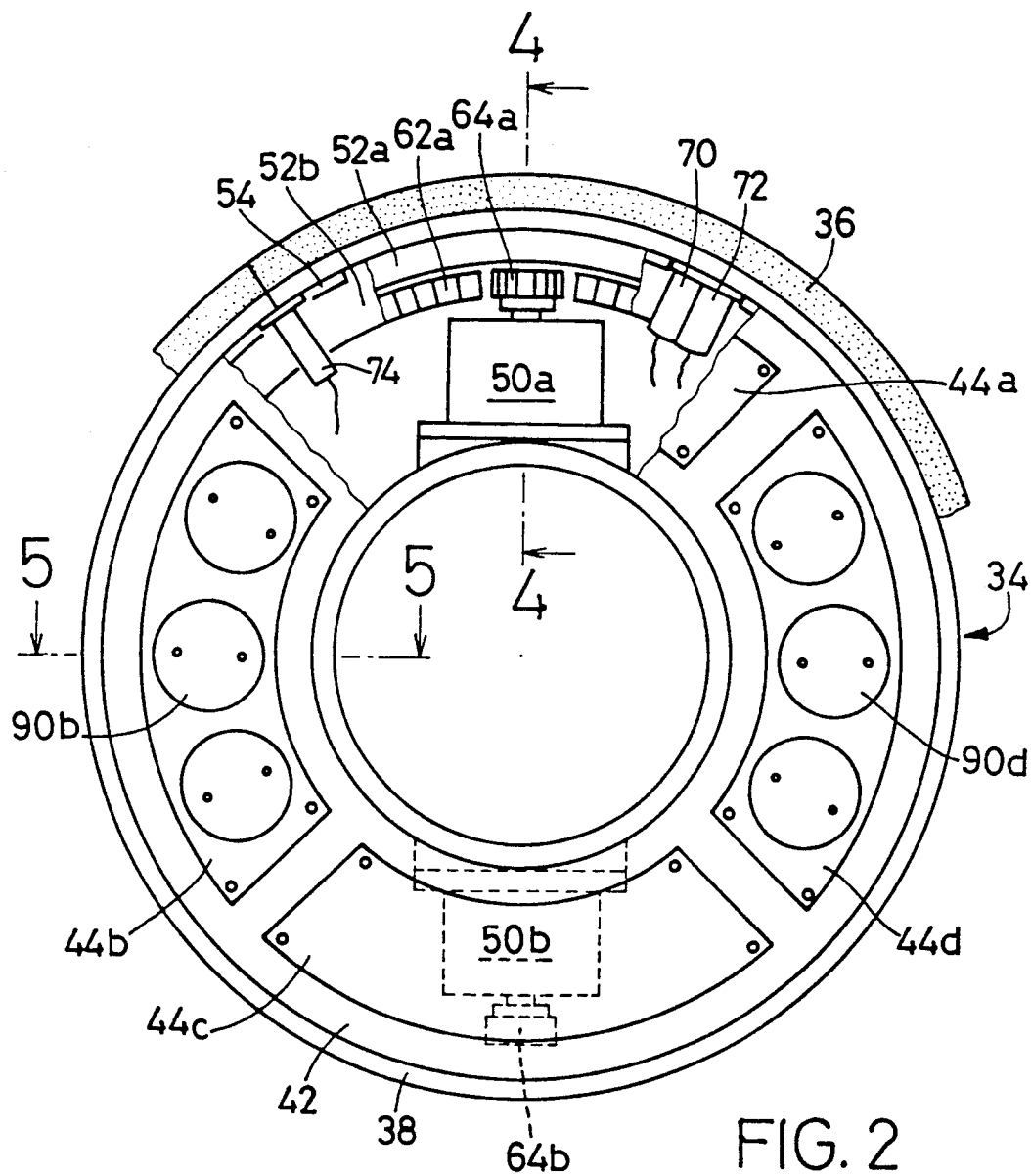
FIG. 2 is a partly cut-away front elevational view, showing the grinding wheel of FIG. 1.

Referring next to FIG. 2, the grinding wheel 18 consists of a core portion 34 and an abrasive portion 36. The core portion 34 has a body 38, a circular first closure member 42, and four sectorial second closure members 44a, 44b, 44c, 44d, as shown in FIG. 3. The body 38 has an inner and an outer cylindrical wall, and an annular plate which connects corresponding axial ends of the two cylindrical walls. The first closure member 42 has four generally sectorial windows 40 which are equally spaced from each other in its circumferential direction. The second closure members 44a-44d are removably attached to the first closure member 42, so as to close respective openings of the four sectorial windows 40. The first closure member 42 with the second closure members 44a-44d attached thereto is fitted in an open end portion of the body 38, so as to fluid-tightly close the opening of the body 38. The abrasive portion 36 consists of a plurality of abrasive pieces each containing highly durable abrasive grains such as diamond grains or CBN grains. The abrasive pieces which cooperate to form an annular abrasive member are bonded to the outer circumferential surface of the core portion 34 by a suitable bonding material.

In the core portion 36 of the grinding wheel 18, there are provided an automatic wheel balance control device for automatically dynamically balancing the grinding wheel 18, a vibration detecting device for detecting vibrations which may occur during the grinding operation by the wheel 18, and a temperature sensing device for measuring a temperature of the wheel 18 during its grinding operation.

Referring next to FIG. 4 which is a cross sectional view taken along line 4—4 of FIG. 2, the automatic wheel balance control device has two annular balancing members in the form of concentric ring gears 52a, 52b, and a pair of ultrasonic motors 50a, 50b which serve as drive means for driving the ring gears 52a, 52b. The ultrasonic motors 50a, 50b are respectively located on diametrically opposite portions of the outer circumferential surface of the inner cylindrical wall of the body 38 of the core portion 34, such that the motors 50a, 50b are fixed to the body 38 while facing upwards and downwards as seen in FIG. 2, respectively. That is, each of the ultrasonic motor 50a, 50b has a pinion 64a, 64b which is fixed to an output shaft of the corresponding motor 50a, 50b, and which extends radially outwardly from the motor 50a, 50b. The ultrasonic motors 50a, 50b are operated to rotate the respective ring gears 52a, 52b, which are rotatably slidably supported on the inner circumferential surface of the outer cylindrical wall of the body 38. These ring gears 52a, 52b are supported by sliding members 54, 56, 58 which also function as spacers, such that the gears 52a, 52b are held in concentric relation with the body 38 of the core portion 34. The ring gears 52a, 52b have respective recesses 60a, 60b which permit the center of gravity of the grinding wheel 18 to deviate from the geometric center of the wheel 18. The ring gears 52a, 52b have an L-shaped cross section, as shown in FIG. 4, and have respective sets of internal teeth 62a, 62b formed in their mutually facing surfaces which are spaced apart from each other in the axial direction of the wheel 18. The internal teeth 62a, 62b of the ring gears 50a, 50b engage with the pinions 64a, 64b of the ultrasonic motors 50a, 50b, respectively, so that the ring gears 52a, 52b are rotated by the motors 50a, 50b in order to dynamically balance the grinding wheel 18 (or correct imbalance of the wheel 18). It is to be noted that the recess 60b of the ring gear 52b is not shown in FIG. 4 because the recess 60b is positioned opposite to the recess 60a diametrically of the body 38. In the instant embodiment, the center of gravity of the grinding wheel 18 except the ring gears 52a, 52b is located in the center of the wheel 18 as viewed in its axial or width direction. Further, as is apparent from FIG. 4, the ring gears 52a, 52b are disposed close to each other in the core portion 34, on the opposite sides of the axially central point of the wheel 18. Therefore, the axial position of the center of gravity of the wheel 18 except the ring gears 52a, 52b is held in close proximity to that of the center of the resultant gravity of the ring gears 52a, 52b.

The vibration detecting device includes two vibration sensors 70 and two acoustic-emission or acoustic-wave sensors 72 (hereinafter referred to as "AE sensor 72"), as shown in FIG. 2. These vibration sensors 70 and AE sensors 72 are fixedly disposed on the inner circumferential surface of the outer cylindrical wall of the body 38, such that each pair of the sensors 70 (72) are equally spaced apart from each other in the circumferential direction of the wheel 18. The vibration sensors 70 function to detect vibrations in a frequency range from 10 Hz to 1 KHz, which include chattering or patting phenomena occurring during the grinding operation of the wheel 18, and vibrations due to the dulling of cutting edges of the wheel 18, namely, due to so-called "glazing" of the wheel 18. The AE sensors 72 function to detect vibrations in a frequency range from 50 KHz to 2 MHz, that is, high-frequency, ultrasonic vibrations in the form of acoustic or elastic waves, which derive from a part of an energy stored in the abrasive material of the wheel 18 when any cracks occur or develop in the material during the grinding operation. The temperature sensing device has a thermocouple 74 which is fixedly disposed on the inner circumferential surface of the outer cylindrical wall of the body 38 of the core portion 34, as shown in FIG. 2. The thermocouple 74 includes a detecting probe which extends radially outwardly through the outer cylindrical wall of the body 38, in order to accurately measure a temperature at the grinding surface of the abrasive portion 36 of the wheel 18.

Figure 5:
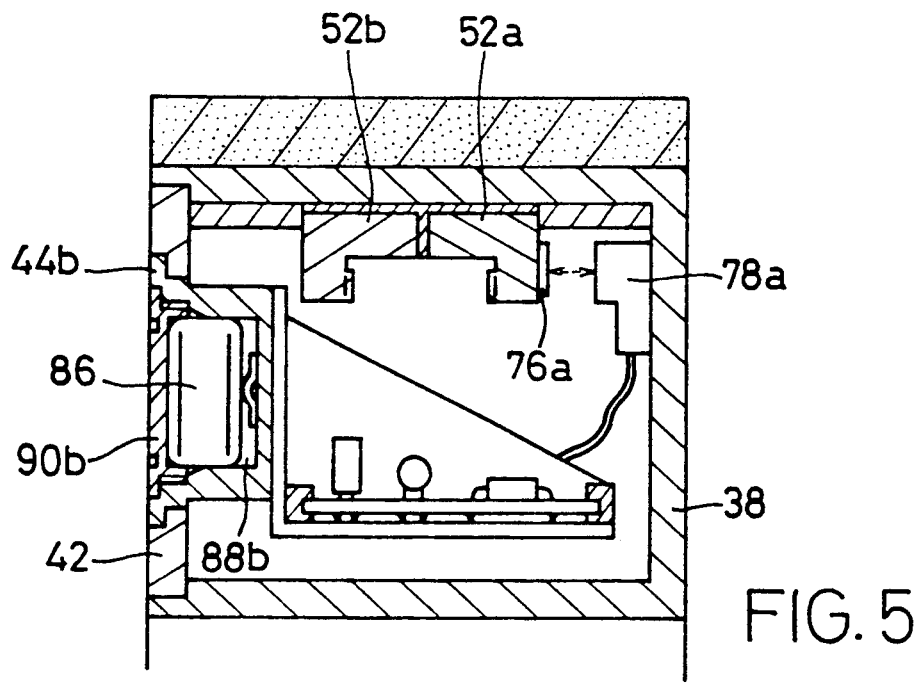
FIG. 5 is a cross sectional view taken along line 5—5 of FIG. 2.

Referring next to FIG. 5, two detection plates 76a, 76b are fixedly disposed on respective axially outer side faces of the concentric ring gears 52a, 52b. On the other hand, two photoelectric sensors 78a, 78b are fixedly provided within the body 38 of the core portion 34, so as to detect the respective detection plates 76a, 76b to determine whether or not the ring gears 52a, 52b are placed in their predetermined home positions. While on of the detection plate 76a and one of the photoelectric sensor 78a are shown in FIG. 5, it is to be noted that the other plate 76b and the other sensor 78b are located in respective positions which are positioned symmetrically with those of the counterparts 76a, 78a, with respect to the center of the grinding wheel 18.

As shown in FIG. 5 by way of example, the second closure members 44b and 44d partially define three chambers 88b and three chambers 88d, respectively, in which are accommodated a detecting circuit 80 for the above-indicated sensors 70, 72, 74, 78a and 78b, a driver circuit 82 for the ultrasonic motors 50a, 50b, and a battery 86 used as a power source for a transmitter/ receiver circuit 84 (which will be described). The chambers 88b, 88d are fluid-tightly sealed by respective caps 90b, 90d which are threaded in the corresponding closure members 44b, 44d. In this arrangement, the battery 86 (received in one of the chambers 88b as shown in FIG. 5) may be replaced by a new one. On the second closure members 44b, 44d, there are provided substrates of the above-indicated electric circuits, such as the detecting circuit 80 for the sensors 70, 72, 74, 78a and 78b, the driver circuit 82 for the ultrasonic motors 50a, 50b and the transmitter/receiver circuit 84. It is to be noted that the chambers 88d are not shown in FIG. 5 which is a cross sectional view taken along line 5—5 of FIG. 2.

The electric arrangement in the core portion 34 is illustrated in the right-hand side half of the block diagram of FIG. 6, by a one-dot chain line. The transmitter/receiver circuit 84 receives and demodulates radio waves which are transmitted in the air and received by an antenna 92 connected thereto. Then, the transmitter/receiver circuit 84 applies control signals to the driver circuit 82, which in turn drives the ultrasonic motors 50a, 50b according to the control signals, so that the imbalance of the grinding wheel 18 can be automatically rectified. The control signals are representative of appropriate directions and angles of the rotary movements of the ring gears 52a, 52b by the ultrasonic motors 50a, 50b. Upon receipt of output signals from the photoelectric sensors 78a, 78b, the detecting circuit 80 supplies the transmitter/receiver circuit 84 with a position signal which indicates that the ring gears 52a, 52b are placed in the respective predetermined home positions. The detecting circuit 80 also receives output signals from the vibration sensor 70 and the AE sensor 72, and supplies the transmitter/receiver circuit 84 with a vibration signal and an AE signal representative of the vibrations and the ultrasonic waves (acoustic emissions), respectively, which occur during the grinding operation of the wheel 18. Upon receipt of an output signal from the thermocouple 74, the detecting circuit 80 supplies the transmitter/receiver circuit 84 with a temperature signal representative of the temperature at the grinding surface of the wheel 18 during its grinding operation. The transmitter/receiver circuit 84 modulates the position signal, vibration signal, AE signal and temperature signal received from the detecting circuit 80, and transmits radio waves corresponding to the modulated signals indicated above, through the antenna 92.

Referring back to FIG. 1, the instant grinding machine further includes a vibration sensor 100, a detection plate 102 and a photoelectric sensor 104, which cooperate with each other to detect imbalance of the rotating grinding wheel 18. The vibrations sensor 100 is fixed to a portion of the machine frame 16 in the vicinity of the drive shaft 10, for detecting vibrations transmitted to the drive shaft 10. The photoelectric sensor 104 serves as a wheel position sensor for detecting passing of the detection plate 102 fixed to the first flange 24, so as to determine a rotary phase or angular position of the wheel 18, as described later. The output signals emitted by these sensors 100, 104 are applied to an arithmetic control device 106 of the machine. On the other hand, the radio waves transmitted from the transmitter/receiver circuit 84 in the rotating core portion 34 are received and demodulated by a transmitter/receiver circuit 108 connected to the arithmetic control device 106, and then applied to the arithmetic control device 106. The arithmetic control device 106 is constituted by a microcomputer which includes a CPU (central processing unit), a ROM (read-only memory), a RAM (random-access memory) and an interface circuit, and operates to process input signals according to a program stored in the ROM, while utilizing a temporary data storage function of the RAM.

As shown in FIG. 1, the instant grinding machine also includes a work table 120 for feeding a workpiece 118, a table feeding motor 122 for moving the work table 120, and a grinding control circuit 116 for controlling the wheel drive motor 12 and the table feeding motor 122.

In the instant grinding machine, a rotary dresser 128 is provided on a dresser table 132 which is moved by a table feeding motor 132 in the axial direction of the wheel 18, as shown in FIG. 1. The rotary dresser 128 is rotated by a dresser rotating motor 124 disposed on the dresser table 132, and the amount of infeed of the dresser 128 is changed as needed by a dresser infeed motor 126. The dresser rotating motor 124, dresser infeed motor 126, and table feeding motor 130 are all controlled by the grinding control circuit 116 indicated above. The grinding control circuit 116 operates not only to stop the wheel drive motor 12 according to an error signal applied from the arithmetic control device 106, but also to command these motors 124, 126, 130 to automatically perform a series of dressing actions, according to a dressing start command (which will be described). During the series of the dressing actions, the amount of infeed of the rotary dresser 128 is controlled based on a contact signal which is applied from the arithmetic control device 106 to the dresser infeed motor 126.

The electric arrangement outside the rotating grinding wheel 18 is illustrated in the left-hand side half of the diagram of FIG. 6, by a two-dot chain line. As seen in the figure, the arithmetic control device 106 is functionally constituted by wheel balancing control means 110 for calculating the amount of rotation of the ring gears 50a, 50b for dynamically balancing the rotating grinding wheel 18, and grinding monitoring means 112 for determining the condition of the grinding operation by the wheel 18 and controlling the grinding operation.

More specifically, the wheel balancing control means 110 calculates the degree of imbalance of the rotating grinding wheel 18, that is, the amount of rotation of the ring gears 50a, 50b by the ultrasonic motors 50a, 50b, based on output signals applied from the vibration sensor 100 and photoelectric sensor 104, according to a predetermined relationship stored in the control means 110. Namely, a vibrational displacement Db which is represented by the output signal from the vibration sensor 100 is represented by the following equation:

$$Db = Db_{max} \cdot \sin \omega t \qquad (1)$$

where,
  $Db_{max}$: maximum amplitude of vibrations
  $\omega$: angle of rotation of the wheel 18 measured from a reference angular position
  $t$: time.

The wheel balancing control means 110 is adapted to automatically balance the rotating grinding wheel 18, according to a wheel balance control routine as illustrated in the flow chart of FIG. 7. Initially, step SR1 is implemented to calculate the maximum amplitude $Db_{max}$ of the vibrations as detected at the machine frame 16 or drive shaft 10, based on the output signal from the vibration sensor 100. Then, step SR2 is executed to determine whether the maximum amplitude Dbmax exceeds a reference value Da or not. When the maximum amplitude Dbmax is equal to or smaller than the reference value Da, the present control routine is terminated. When the maximum amplitude Dbmax exceeds the reference value Da in step SR2, the control flow goes to step SR3 to calculate a rotary phase or angular position $\omega o$ indicative of the current angular position of the center of gravity of the wheel 18, which is deviated from the center of rotation of the wheel 18. The calculation of the rotary phase $\omega o$ is achieved by measuring the time duration from the point when the photoelectric sensor 104 outputs a pulse signal indicative of the reference angular position of the wheel 18, to the point when the maximum amplitude Dbmax is detected by the vibration sensor 100. This measurement is effected by a clock counter of the control means 110. In the initialization step (which is not shown in FIG. 7), the concentric ring gears 52a, 52b are placed in the respective predetermined home positions, so that the resultant center of gravity of the two ring gears 52a, 52b coincides with the axis of rotation of the wheel 18. Accordingly, it will be understood that the current position of the center of gravity of the wheel 18 obtained in step SR3 is substantially associated with the wheel 18 except the ring gears 52a, 52b. In the next step SR4, the directions and amounts of the rotary movements of the ring gears 52a, 52b, that is, the rotating directions and amounts of the ultrasonic motors 50a, 50b, are determined, so that the resultant center of gravity of the ring gears 52a, 52b is placed in an angular position which is spaced 180 degrees from the rotary phase $\omega o$ indicative of the current angular position of the center of gravity of the wheel 18, and so that the resultant center of gravity of the ring gears 52a, 52b is offset from the center of the wheel 18 by a predetermined radial distance. Then, control signals representative of the thus determined rotating directions and amounts of the ultrasonic motors 50a, 50b are converted into the radio waves, which are transmitted from the transmitter/receiver circuit 108 outside the wheel 18 to the transmitter/receiver circuit 84 within the core portion 34 of the wheel 18. Consequently, the ultrasonic motors 50a, 50b are driven by the drive circuit 82, based on the control signals received from the circuit 84, so as to rotate the respective ring gears 52a, 52b by the determined amounts in the determined directions.

The transmitter/receiver circuit 108 outside the wheel 18 receives and demodulates the radio waves which are transmitted from the transmitter/receiver circuit 84 in the the core portion 34, so as to supply the grinding monitoring means 112 with the position signal produced by the photoelectric sensors 78a, 78b, the vibration signal and the AE signal respectively produced by the vibration sensor 70 and the AE sensor 72, and the temperature signal produced by the thermocouple 74. These output signals received by the grinding monitoring means 112 are fed to the grinding control circuit 116 for controlling the wheel drive motor 12 and the table feeding motor 122, for example. At the same time, the grinding monitoring means 112 determines the grinding condition of the wheel 18 based on the above output signals, according to judgement data which are stored in the monitoring means 112. The result of the determination by the grinding monitoring means 112 is indicated on a display 114, and is utilized to initiate dressing of the wheel 18 or to stop the rotating wheel 18, as will be described in detail below.

Reference is now made to the flow chart of FIG. 8. If the grinding monitoring means 112 determines that the vibrations signal $D_C$ produced by the vibration sensors 70 in the core portion 34 has an amplitude or an effective value which is larger than a predetermined first reference value $D_{B1}$, the monitoring means 112 commands the display 114 to provide a first vibration alarm, and applies a wheel stop command to the grinding control circuit 116 so as to stop the wheel drive motor 12, that is, to stop the rotating wheel 18. When the core portion 34 suffers from vibrations having an excessively large amplitude, despite the movements of the ring gears 52a, 52b, it is presumed that cracks or other defects occur at the abrasive portion 36 of the wheel 18. In this case, the grinding monitoring means 112 commands the grinding control circuit 116 to stop the wheel drive motor 12 to stop the rotating wheel 18. If the grinding monitoring means 112 determines that the amplitude or effective value of the vibration signal $D_C$ is equal to or smaller than the first reference value $D_{B1}$, but larger than a predetermined second reference value $D_{B2}$ ($<D_{B1}$), the monitoring means 112 commands the display 114 to provide a second vibration alarm, and applies a dressing start command to the grinding control circuit 116 so as to start dressing the grinding wheel 18. The vibration sensors 70 usually generate the signal $D_C$ whose level is between the first and second reference values $D_{B1}$, $D_{B2}$, when the grinding surface of the abrasive portion 36 of the wheel 18 is locally glazed or worn. In this case, the grinding monitoring means 112 causes the grinding control circuit 116 to effect dressing of the wheel 18 so as to expose sharp cutting edges of the abrasive grains of the abrasive portion 36.

As shown in FIG. 8, when the grinding monitoring means 112 determines that the wheel temperature T measured by the thermocouple 74 in the core portion 34 is higher than a predetermined reference value $T_B$, the display 114 provides a temperature alarm which indicates the temperature at the grinding surface of the abrasive portion 34 of the wheel 18 is excessively high.

Referring next to the flow chart of FIG. 9, if the level of the AE signal produced by the AE sensors 72 in the core portion 34 is smaller than a predetermined reference value $AE_B$, and the wheel temperature T measured by the thermocouple 74 is higher than a predetermined reference value $T_C$, the grinding monitoring means 112 commands the display 114 to provide a wheel glazing alarm, and applies a dressing start command to the grinding control circuit 116. When the exposed abrasive grains of abrasive portion 36 become dull to render the grinding surface of the wheel 18 glazed, the level of the AE signal associated with breakage of the exposed grains is lowered, and the temperature at the grinding surface of the wheel 18 is elevated because of the friction between the workpiece 118 and the grinding surface. In this case, the wheel glazing alarm is displayed on the display 114, and the grinding control circuit 116 receives the dressing start command from the grinding monitoring means 112. Thus, a series of dressing actions are automatically effected to expose sharp cutting edges of the abrasive grains of the abrasive portion 36.

The grinding control circuit 116 is also constituted by a microcomputer, and operates to process input signals according to programs stored in the circuit 116, so as to control the above-indicated motors 12, 122, 124, 126, 130. The operations of the grinding control circuit 116 are illustrated in the flow charts of FIGS. 10 and 11.

When the grinding control circuit 116 receives the wheel stop command from the grinding monitoring means 112 of the arithmetic control device 106, the control circuit 116 stops applying drive signals to the wheel drive motor 12 to thereby stop the rotating wheel 18, as shown in FIG. 10. When the grinding control circuit 116 receives the dressing start command from the grinding monitoring means 112 of the arithmetic control device 106, a dressing control routine as illustrated in FIG. 11 is implemented. Initially, prior to the actual dressing of the wheel 18, the control circuit 116 operates to drive the table feeding motor 112 to move the work table 122 back to its home position, so that the workpiece 118 is retracted away from the wheel 18. Then, the dresser rotating motor 124 is actuated to rotate the rotary dresser 128, and the table feeding motor 130 is actuated to move the dresser table 132 to the position where the rotary dresser 128 starts dressing the grinding wheel 18. Subsequently, a dresser infeed control routine as illustrated in FIG. 12 is implemented.

Initially, step SS1 is executed to determine whether or not the grinding control circuit 116 receives the AE signal produced by the AE sensors 72 from the arithmetic control device 106. The presence of the AE signal can be considered to indicate that the rotary dresser 128 is held in contact with the abrasive portion 36 of the wheel 18. If a negative decision (NO) is obtained in step SS1, step SS2 is implemented to actuate the dresser infeed motor 126 to continuously move the rotary dresser 128 toward the outer circumferential surface (grinding surface) of the wheel 18. These steps SS1 and SS2 are repeatedly executed until an affirmative decision (YES) is obtained in step SS1. Then, the control flow goes to step SS3 in which the infeed of the dresser 128 by the dresser infeed motor 126 is temporarily stopped. Step SS3 is followed by step SS4 in which the dresser infeed motor 126 is re-actuated to infeed the rotary dresser 128 only by 1 $\mu$m. In this manner, the rotary dresser 128 is fed into the grinding surface of the abrasive portion 36 of the wheel 18 only by 1 $\mu$m.

After the amount of infeed of the rotary dresser 128 is determined as described above, the dresser 128 (or the dresser table 132) is reciprocated by the table feeding motor 130, in the direction parallel to the axis of wheel 18, so as to dress the wheel 18 to obtain sharp cutting edges of the abrasive grains exposed on the outer circumferential surface of the wheel 18. Then, the dresser infeed motor 126 and the table feeding motor 130 are operated so that the rotary dresser 128 is returned back to its home position, and the dresser rotating motor 124 is stopped.

Referring next to the flow chart of FIG. 13, there will be described a table feed control routine associated with the feed control of the grinding control circuit 116. In this control routine, the feed rate of the table feeding motor 122 is controlled so that the wheel temperature T is held in a predetermined optimum range (Tm2 $\leq$ T $\leq$ Tm1), and so that the amplitude Dc of the vibration signal is held in a predetermined optimum range (Dm2 $\leq$ Dc $\leq$ Dm1). Namely, step ST1 is first executed to read the wheel temperature T measured by the thermocouple 74, and the vibration signal Dc produced by the vibrations sensors 70, based on the output signals received from the arithmetic control device 106. Then, step ST2 is implemented to determine whether the actual wheel temperature T is held in the optimum range (Tm2 $\leq$ T $\leq$ Tm1) or not, and step ST3 is implemented to determine whether the level Dc of the vibration signal indicative of the actual vibrations of the wheel 18 is held in the optimum range (Dm2 $\leq$ Dc $\leq$ Dm1) or not. If affirmative decisions (YES) are obtained in both steps ST2 and ST3, the control flow goes to step ST4 in which the rotating speed N of the table feeding motor 122 for feeding the work table 120 is maintained at the current value N. Where the determination in step ST2 indicates that the wheel temperature T exceeds the upper limit Tm1 of the above optimum range, or where the determination in step ST3 indicates that the amplitude Dc of the vibration signal exceeds the upper limit Dm1 of the above optimum range, the control flow goes to step ST5 in which the rotating speed N of the table feeding motor 122 is obtained by subtracting a predetermined value $\Delta$N from the current value N. Where the determination in step ST2 indicates that the wheel temperature T is lower than the low limit Tm2 of the above optimum range, or where the amplitude Dc of the vibration signal is smaller than the lower limit Dm2 of the above optimum range, the control flow goes to step ST6 in which the rotating speed N of the table feeding motor 122 is obtained by adding the predetermined value $\Delta$N to the current value N. Under the feed control of the grinding control circuit 116, the table feeding motor 122 is operated to feed the work table 120, according to the rotating speed N which is determined so that the wheel temperature T and the amplitude Dc of the vibrations are held in the respective optimum ranges. Accordingly, the present grinding machine is capable of effecting the grinding of the workpiece 118 with improved efficiency, without burning of the surface of the workpiece 118.

In the illustrated embodiment, the core portion 34 of the grinding wheel 18 accommodates therein the concentric ring gears 52a, 52b serving as balancing members, the ultrasonic motors 50a, 50b for changing the rotary phases (angular positions) of the ring gears 52a, 52b, the transmitter/receiver circuit 84 which receives and demodulates the radio waves to output the control signals, and the driver circuit 82 for driving the ultrasonic motors 50a, 50b according to the control signals. In operation, the driver circuit 82 actuates the ultrasonic motors 50a, 50b, according to the control signals received from the transmitter/receiver circuit 84, so as to change the rotary phases of the ring gears 52a, 52b. In this arrangement, the grinding wheel 18 can be dynamically balanced without stopping the rotating wheel 18, whereby the operating efficiency of the present grinding machine is significantly enhanced. Further, since the imbalance of the wheel 18 can be automatically rectified while the wheel 18 is being rotated, it is possible to eliminate unfavorable local wear of the outer circumferential surface of the wheel 18, which would result from a delay in re-establishing the balance of the wheel 18. Thus, the grinding machine equipped with the instant grinding wheel 18 can be operated with high accuracy, and the life expectancy of the wheel 18 can be significantly elongated.

In the grinding wheel 18 of the illustrated embodiment, the vibration sensors 70 and the AE sensors 72 disposed within the core portion 34 are adapted to detect relatively low-frequency vibrations and relatively high-frequency acoustic emissions or waves, respectively, which occur during the grinding operation of the wheel 18. These sensors 70, 72 then produce the vibration signals and AE signals indicative of the thus detected vibrations and acoustic emissions, and these signals are transmitted through the transmitter/receiver circuit 84 that also functions as vibration signal transmitting means. Thus, the instant grinding wheel 18 is able to accurately detect the vibrations during its grinding operation, without being affected by a jet of fluids which is conventionally applied to the side face of the abrasive portion 36 or by bubbles contained in the fluids. This permits the grinding machine to properly cope with abnormal vibrations, and thus lowers unacceptance or defect ratio of the ground workpieces.

In the grinding wheel 18 of the illustrated embodiment, the thermocouple 74 disposed within the core portion 34 is adapted to measure the temperature in the vicinity of the grinding surface of the wheel 18, and produces the temperature signal indicative of the measured temperature. The temperature signal is transmitted through the transmitter/receiver circuit 84 which also functions as temperature signal transmitting means. Thus, the instant grinding wheel 18 is able to accurately measure the temperature at the grinding surface of wheel 18 during its grinding operation, irrespective of a portion of the surface of the workpiece 118 which is being ground by the wheel 18. This permits the grinding machine to properly cope with abnormal temperature of the wheel 18 and thus lowers the unacceptance ratio of the ground workpieces.

Since the temperature in the vicinity of the grinding surface can be measured by the thermocouple 74 disposed within the core portion 34 of the wheel 18, the temperature measurement is not restricted by the manner of grinding or the configuration of the workpiece to be ground.

In the grinding wheel 18 of the illustrated embodiment, the concentric ring gears 52a, 52b are accommodated in the core portion 34 such that the gears 52, 52b are held in close proximity to each other, and located on both sides of the axial center of the wheel 18. Therefore, the axial center of gravity of the wheel 18 is kept very close to that of the center of resultant gravity of the two ring gears 52a, 52b. This arrangement serves to significantly reduce the magnitude of a couple, which increases with an axial distance between the above two centers of gravity, thereby making the wheel 18 almost free from vibrations due to the couple.

The concentric ring gears 52a, 52b used in the illustrated embodiment are formed with the respective recesses 60a, 60b, so that the ring gears 52a, 52b per se function as balancing members. This arrangement is advantageous as compared with an arrangement wherein an external balancing weight or weights is/are fixed to the ring gears 52a, 52b, because there is no need to provide a space for the rotation of the external balancing weight(s), thereby permitting the core portion 34 to be relatively small-sized.

Since the ring gears 52a, 52b are driven by the ultrasonic motors 50a, 50b in the instant embodiment, the output shafts of the motors 50a, 50b are braked so as to prevent rotation of the gears 52a, 52b while no control signals are applied to the driver circuit 82.

In the instant embodiment, dressing of the wheel 18 is automatically initiated according to the determination of the arithmetic control device 106, as described above. Therefore, the grinding surface of the wheel 18 no longer requires dressing at regular intervals as practiced on the conventional grinding wheel. Conventionally, the interval between successive dressing operations is experientially determined by calculating a period during which the accuracy of the surface finish of the workpiece 118 is maintained at a satisfactory level. Usually, the dressing interval is shorter than the calculated period so as to allow for safety in relation to reduction or variation in the outside diameter of the wheel 18 due to wear. Thus, it has been conventionally inevitable to unnecessarily frequently dress the wheel 18 because of the allowance for safety in grinding.

Figure 15:
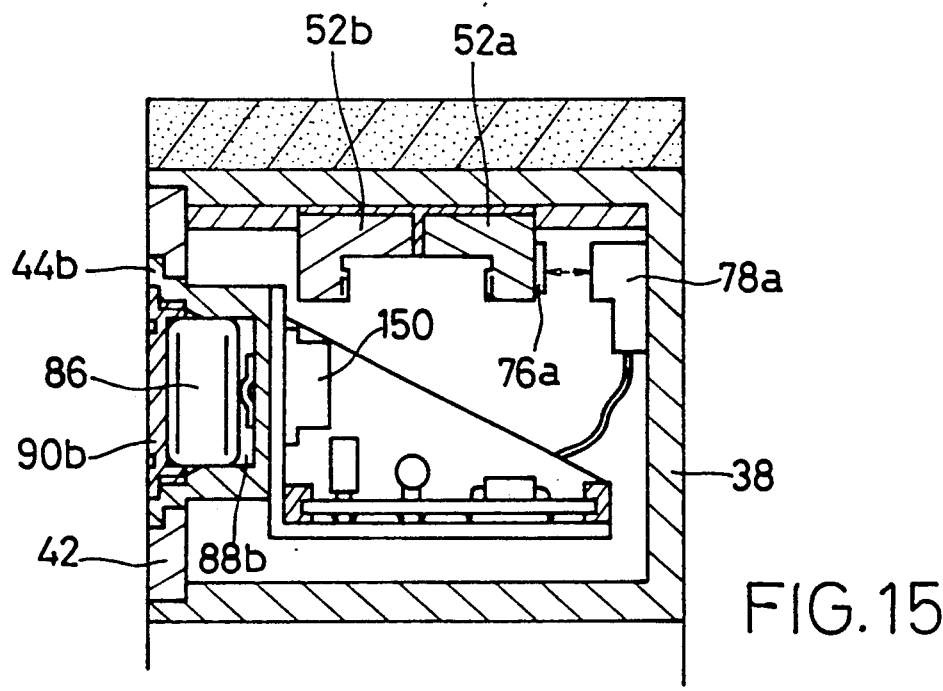

Referring next to FIGS. 14 through 16, there will be described another embodiment of the present invention. In the following description, the same reference numerals as used in the preceding embodiment will be used for identifying functionally corresponding elements, and no redundant explanation of these elements will be provided.

In the instant embodiment, a detecting circuit 180 disposed within the core portion 34 also functions as grinding monitoring means which corresponds to the grinding monitoring means 112 of the arithmetic control device 106 of the preceding embodiment. Namely, the detecting circuit 180 of the instant embodiment is constituted by a microcomputer which includes a CPU (central processing unit) 130, a ROM (read-only memory) 134, and a RAM (random-access memory) 132. The detecting circuit 180 further includes three amplifiers 136, an A/D converter 138 having a multiplexing function, an input interface 140, and an output interface 142. The CPU 130 operates to process input signals according to a program stored in the ROM 134, while utilizing a temporary data storage function of the RAM 132. The input signals to be processed include position signals received from the photoelectric sensors 78a, 78b through the input interface 140, and vibration signals, AE signals and temperature signals, which are received from the vibration sensor 70, AE sensor 72 and thermocouple 74, through the respective amplifiers 136 and the A/D converter 138. The thus processed signals are then applied to the transmitter/receiver circuit 84 through the output interface 142. In this manner, the CPU 130 is adapted to output the dressing start command, wheel stop command, display command for providing the temperature alarm, and display command for providing the wheel glazing alarm, according to the operations as illustrated in FIGS. 8 and 9. Therefore, the grinding monitoring means 112 need not be provided in the arithmetic control device 106, and is replaced by a signal control circuit 143, as shown in FIG. 16. The signal control circuit 143 receives the above-indicated outputs from the detecting circuit 180, through the transmitter/receiver circuits 84, 108, and supplies the display 114 with the display commands for providing the temperature alarm and wheel glazing alarm, and supplies the grinding control circuit 116 with the dressing start command and wheel stop command, when appropriate.

As shown in FIG. 14, the detecting circuit 180 further includes a reference setter 144 and a comparator 146. In this comparator 146, the level of the AE signal produced by the AE sensor 72 is compared with a reference voltage which is preset by the reference setter 144. If the level of the AE signal exceeds the reference voltage, the comparator 146 applies an interrupt signal to the CPU 30, so that the CPU 130 interrupts the successive reading of the input signals from the sensors 70, 72, 74, and reads only the AE signals from the AE sensor 72. The provision of the setter 144 and the comparator 146 leads to improved accuracy in detecting contact between the abrasive portion 36 and the rotary dresser 128 during the dressing of the wheel 18.

In the core portion 34 of the grinding wheel 18, there is provided a centrifugal switch device 150 which is actuated by centrifugal force acting thereon, as shown in FIG. 15. More specifically, the centrifugal switch device 150 has a weight, and a spring for forcing the weight toward the axis of rotation of the wheel 18, and a switch is operated when the weight is moved radially outwards against the biasing force of the spring. That is, the switch is closed when the centrifugal force acting on the weight becomes equal to or larger than a predetermined value. The centrifugal switch device 150 functions as a power ON-OFF switch which operates to apply power from the battery 86 to the electronic circuits 80, 82, 84 disposed in the core portion 34 while the above switch is in the closed position. In this arrangement, the power source for the above electric circuits 80, 82, 84 is automatically turned on when the rotation of the grinding wheel 10 is started.

Figure 17:
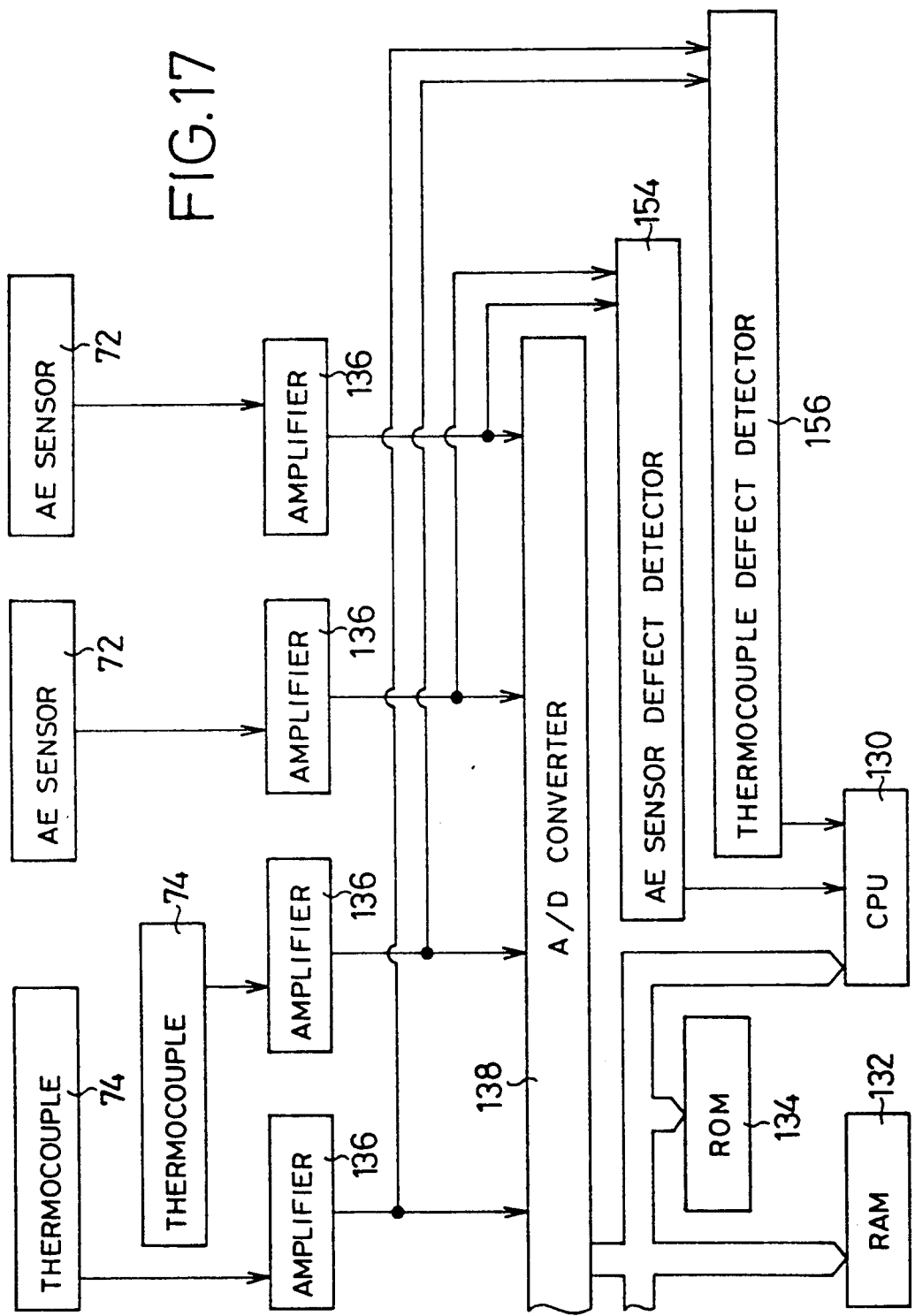
FIG. 17 is a block diagram showing a major portion of a detecting circuit incorporated in a grinding wheel according to another embodiment of the invention.

A further embodiment will be described referring to FIG. 17. In the core portion 34 of the instant grinding wheel 18, there are provided a plurality of AE sensors 72 and thermocouples 74, and an AE sensor defect detector 154 and a thermocouple defect defector 156 for detecting defects of the AE sensors 72 and the thermocouples 74, respectively. For instance, the AE sensor defect detector 154 determines that any one of the AE sensors 72 has a trouble due to disconnection or short-circuiting, by sensing that the level of the AE signal produced by the relevant one AE sensor 72 reaches zero or an approximately maximum value. Similarly, the thermocouple defect detector 156 determines that any one of the thermocouples 74 is defective, by sensing that the level of the temperature signal reaches zero or an approximately maximum value. When the detectors 154, 156 determine that any one of the the AE sensors 72 and the thermocouples 74 is defective, the CPU 130 commands the A/D converter 138 to read only the output signals from the AE sensor(s) 72 and the thermocouple(s) 74 which normally operate to produce reliable outputs. Accordingly, the detecting circuit 180 including the CPU 130 is able to perform the grinding monitoring function for a while, even after any one of the AE sensors 72 or the thermocouples 74 has a trouble. In the instant embodiment, the AE sensor defect detector 154 and the thermocouple defect detector 156 serve as defect detecting means, and the A/D converter 138 serves as switching means.

While the present invention has been described in its presently preferred embodiments, for illustrative purpose only, it is to be understood that the invention is not limited to the precise details of the illustrated embodiments, but may be otherwise embodied.

While the grinding wheel 18 used in the above embodiments has a cylindrical shape, a cup-shaped grinding wheel may be suitably used.

In the illustrated embodiments, the automatic wheel balance control device, the vibration detecting device and the temperature sensing device are provided within the core portion 34 of the wheel 18. However, the principle of the invention does not exclude an arrangement wherein only one of the above three devices is disposed within the wheel 18.

It is also possible that three or four vibration sensors 70, AE sensors 72, thermocouples 74 are disposed within the core portion 34 of the wheel 18, such that the sensors 70, 72, 74 of the same kind are equally spaced apart from each other in the circumferential direction of the wheel 18. In this case, the defect detecting means and switching means described above may be provided so that the normal operation of the grinding monitoring means can be maintained even if one of the sensors 70, 72, 74 suffers from a trouble.

In the illustrated embodiments, the concentric ring gears 50a, 50b disposed in the core portion 34 of the wheel 18 function as balancing members since the recesses 60a, 60b are respectively formed in the ring gears 50a, 50b. However, the recesses 60a, 60b may be replaced by suitable balancing weights which are attached to the ring gears 50a, 50b.

While the battery 86 serving as a voltage source is provided in the core portion 34 of the wheel 18 in the illustrated embodiments, the battery 86 may be replaced by a battery which generates electric power upon exposure to a radiation or microwaves.

While the abrasive portion 36 of the wheel 18 is composed of highly durable abrasive grains in the illustrated embodiments, the abrasive portion 36 may be composed of silicon carbide grains or fused almina grains.

Figure 13:
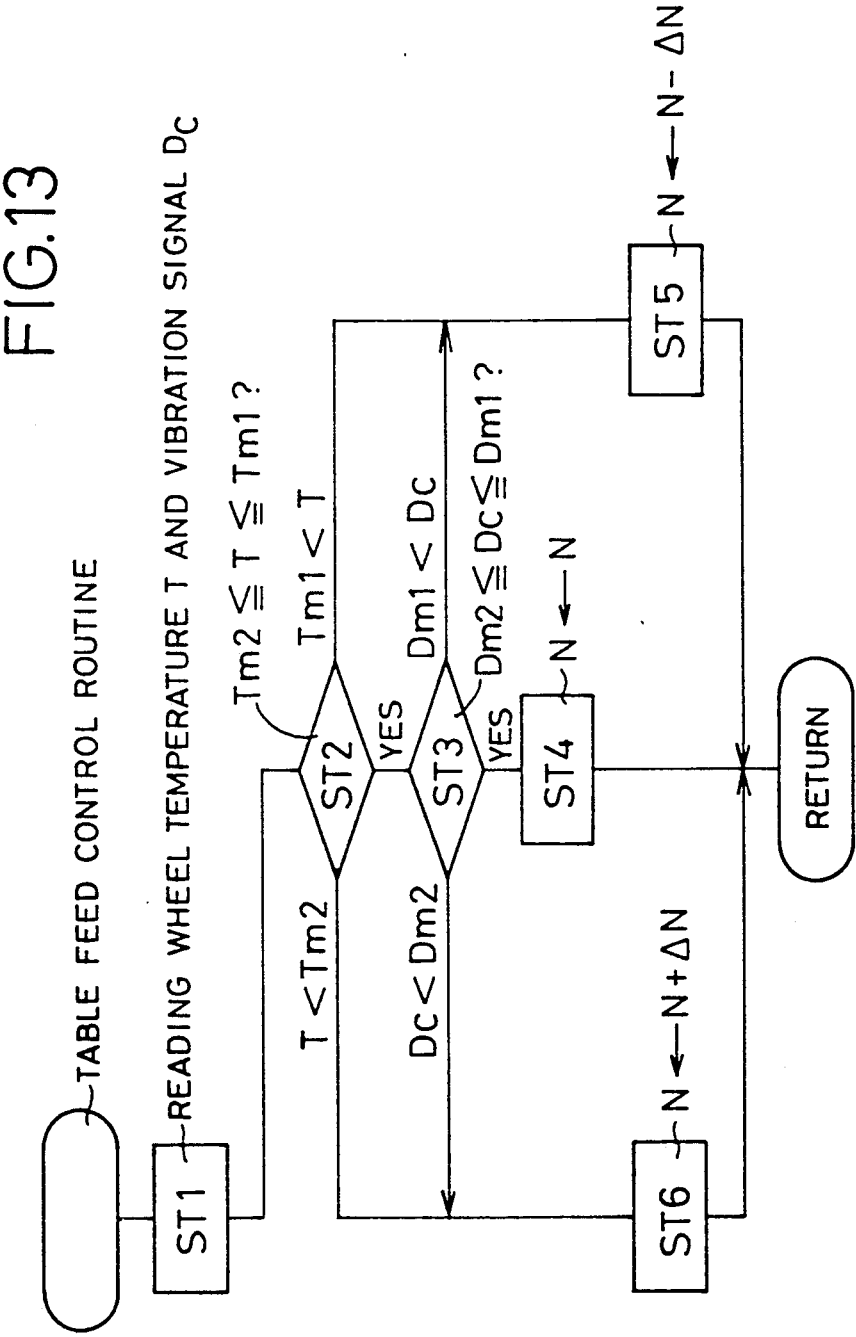

In the table feed control routine as illustrated in FIG. 13, one of steps ST2 and ST3 may be deleted.

It is also to be understood that the present invention may be embodied with various other changes, modifications and improvements which may occur to those skilled in the art, without departing from the spirit and scope of the invention defined in the following claims.

What is claimed is:

1. A grinding wheel for grinding a workpiece, comprising;
   a core portion connected to a drive shaft;
   an abrasive portion fixed to an outer circumferential surface of said core portion for grinding said workpiece;
   at least one balancing member disposed in said core portion such that said at least one balancing member is movable in a circumferential direction of the wheel;
   drive means disposed in said core portion, for moving said at least one balancing member in the circumferential direction so as to change an angular position of each of said at least one balancing member;
   signal receiving means disposed in said core portion, for receiving a control signal for balancing said grinding wheel, said control signal being transmitted in the air from the outside of the wheel; and
   a driver control circuit disposed in said core portion, for operating said drive means for moving said at least one balancing member so as to balance said grinding wheel, according to said control signal received by said signal receiving means.

2. A grinding wheel according to claim 1, wherein said core portion has an inner and outer cylindrical wall which are radially spaced apart from each other, said at least one balancing member comprising a pair of concentric ring gears which are supported on an inner circumferential surface of said outer cylindrical wall of said core portion, such that said ring gears are movable in the circumferential direction thereof, each of said ring gears having a center of gravity which is deviated from a geometric center of said each ring gear.

3. A grinding wheel according to claim 1, wherein said drive means comprises at least one ultrasonic motor which corresponds to said at least one balancing member.

4. A grinding wheel according to claim 2, wherein said pair of ring gears are L-shaped in axial cross section, and have respective sets of internal teeth which are opposed to each other in an axial direction thereof with an axial spacing therebetween, and wherein said drive means comprises a pair of ultrasonic motors fixed to said inner cylindrical wall of said core portion, each of said ultrasonic motors having a pinion which is located in said axial spacing for engagement with said internal teeth of a corresponding one of said pair of ring gears.

5. A grinding wheel according to claim 1, further comprising a centrifugal switch disposed in said core portion, for sensing a centrifugal force acting thereon while said wheel is rotating, said centrifugal switch being turned on in the presence of the centrifugal force, for applying electric power to said signal receiving means and said control circuit.

6. A grinding machine including a grinding wheel as defined in claim 1, comprising wheel balance detecting means for producing said control signal, said wheel balance detecting means comprising:
 a vibration sensor for detecting vibrations of said drive shaft;
 a wheel position sensor for detecting a reference angular position of said grinding wheel and determining a current angular position of the wheel with respect to said reference position;
 means for calculating a center of gravity of said grinding wheel, based on a time measured from a point when said reference position is detected by said wheel position sensor, to a point when a maximum amplitude of the vibrations detected by said vibration sensor is reached during rotation of said grinding wheel; and
 means for preparing said control signal so that a center of resultant gravity of said grinding wheel and said at least one balancing member coincides with an axis of rotation of said grinding wheel.

7. A grinding wheel according to claim 1, further comprising:
 vibration detecting means disposed in said core portion, for detecting vibrations including ultrasonic vibrations at a portion close to said abrasive portion, said vibrations occurring during a grinding operation of said abrasive portion, so as to produce a vibration signal indicative of said vibrations; and
 vibration signal transmitting means disposed in said core portion, for transmitting in the air said vibration signal from said vibration detecting means, so as to monitor a current grinding condition of the wheel.

8. A grinding machine including a grinding wheel as defined in claim 7, comprising:
 vibration signal receiving means for receiving said vibration signal transmitted by said vibration signal transmitting means; and
 a control device for determining said current grinding condition of the wheel, based on said vibration signal received from said vibration signal receiving means.

9. A grinding wheel according to claim 1, further comprising:
 temperature sensing means disposed in said core portion, for sensing a wheel temperature at a portion close to said abrasive portion, during a grinding operation of said abrasive portion, so as to produce a temperature signal indicative of said wheel temperature; and
 temperature signal transmitting means disposed in said core portion, for transmitting in the air said temperature signal from said temperature sensing means, so as to monitor a current grinding condition of the wheel.

10. A grinding machine including a grinding wheel as defined in claim 9, comprising:
 temperature signal receiving means for receiving said temperature signal transmitted by said temperature signal transmitting means; and
 a control device for determining said current grinding condition of the wheel, based on said temperature signal received from said temperature signal receiving means.

11. A grinding wheel according to claim 1, further comprising:
 vibration detecting means disposed in said core portion, for detecting vibrations including ultrasonic vibrations at a portion close to said abrasive portion, said vibrations occurring during a grinding operation of said abrasive portion, so as to produce a vibration signal indicative of said vibrations;
 temperature sensing means disposed in said core portion, for sensing a wheel temperature at a portion close to said abrasive portion, during the grinding operation of said abrasive portion, so as to produce a temperature signal indicative of said wheel temperature; and
 signal transmitting means disposed in said core portion, for transmitting in the air said vibration signal from said vibration detecting means and said temperature signal from said temperature sensing means, so as to monitor a current grinding condition of the wheel.

12. A grinding machine including a grinding wheel as defined in claim 11, comprising:
 signal receiving means for receiving said vibration signal and said temperature signal which are transmitted by said signal transmitting means; and
 a control device for determining said current grinding condition of the wheel, based on said vibration signal and said temperature signal which are received from said signal receiving means.

13. A grinding wheel according to claim 1, further comprising:
 vibration detecting means disposed in said core portion, for detecting vibrations including ultrasonic vibrations at a portion adjacent to said abrasive portion, said vibrations occurring during a grinding operation of said abrasive portion, so as to produce a vibration signal indicative of said vibrations;
 grinding monitoring means disposed in said core portion, for determining a current grinding condition of said grinding wheel, based on said vibration signal from said vibration detecting means; and
 transmitting means disposed in said core portion, for transmitting in the air a signal indicative of the determination by said grinding monitoring means.

14. A grinding wheel according to claim 13, wherein said grinding monitoring means determines that said abrasive portion has a dull grinding surface, and produces a dressing start command, when a level of said vibrational signal exceeds a reference value.

15. A grinding wheel according to claim 13, wherein said grinding monitoring means determines that an abnormal vibration occurs in said core portion, and produces a wheel stop command, when a level of said vibrational signal exceeds a reference value.

16. A grinding wheel according to claim 13, wherein said vibration detecting means comprises a plurality of vibration sensors disposed in said core portion, said grinding wheel further comprising:
defect detecting means for detecting a defect of any one of said plurality of vibration sensors;
switching means for applying to said grinding monitoring means only said vibration signal received from at least one of said vibration sensors which is not defective.

17. A grinding wheel according to claim 1 further comprising:
temperature sensing means disposed in said core portion, for measuring a wheel temperature at a portion adjacent to said abrasive portion, during a grinding operation of said abrasive portion, so as to produce a temperature signal indicative of said wheel temperature;
grinding monitoring means disposed in said core portion, for determining a current grinding condition of said grinding wheel, based on said temperature signal from said temperature sensing means; and
transmitting means disposed in said core portion, for transmitting in the air a signal indicative of the determination by said grinding monitoring means.

18. A grinding wheel according to claim 13, wherein said grinding monitoring means determines that the wheel temperature measured by said temperature sensing means is abnormal, and produces a display command providing an indication of the determination, when a level of said temperature signal exceeds a predetermined reference value.

19. A grinding wheel according to claim 17, wherein said temperature sensing means comprises a plurality of temperature sensors disposed in said core portion, said grinding wheel further comprising:
defect detecting means for detecting a defect of any one of said plurality of temperature sensors;
switching means for applying to said grinding monitoring means only said temperature signal received from at least one of said temperature sensors which is not defective.

20. A grinding wheel according to claim 17, wherein said temperature sensing means comprises a thermocouple which has a sensing probe extending through said abrasive portion.

21. A grinding wheel according to claim 1, further comprising:
vibration detecting means disposed in said core portion, for detecting vibrations including ultrasonic vibrations at a portion adjacent to said abrasive portion, said vibrations occurring during a grinding operation of said abrasive portion, so as to produce a vibration signal indicative of said vibrations;
temperature sensing means disposed in said core portion, for measuring a wheel temperature at a portion adjacent to said abrasive portion, during the grinding operation of said abrasive portion, so as to produce a temperature signal indicative of said wheel temperature;
grinding monitoring means disposed in said core portion, for determining a current grinding condition of said grinding wheel, based on said vibration signal from said vibration detecting means and said temperature signal from said temperature sensing means; and
transmitting means disposed in said core portion, for transmitting in the air a signal indicative of the determination by said grinding monitoring means.

22. A grinding wheel according to claim 21, wherein said grinding monitoring means determines that said abrasive portion has a glazed grinding surface, and produces a dressing start command, when a component of said vibrational signal which corresponds to said ultrasonic vibrations is smaller than a predetermined reference value, and said temperature signal exceeds a predetermined reference value.

23. A grinding wheel for grinding a workpiece, comprising:
a core portion connected to a drive shaft;
an abrasive portion fixed to an outer circumferential surface of said core portion for grinding said workpiece;
a thermocouple disposed in said core portion, for sensing a wheel temperature at a portion adjacent to a grinding surface of said abrasive portion, so as to produce a temperature signal indicative of said wheel temperature, said thermocouple having a sensing probe extending through said abrasive portion; and
temperature signal transmitting means disposed in said core portion, for transmitting in the air said temperature signal from said temperature sensing means, so as to monitor a current grinding condition of the wheel.

24. A grinding wheel for grinding a workpiece, comprising:
a core portion connected to a drive shaft;
an abrasive portion fixed to an outer circumferential surface of said core portion for grinding said workpiece;
vibration detecting means disposed in said core portion, for detecting vibrations including ultrasonic vibrations at a portion close to said abrasive portion, said vibrations occurring during a grinding operation of said abrasive portion, so as to produce a vibration signal indicative of said vibrations; and
vibration signal transmitting means disposed in said core portion, for transmitting in the air said vibration signal from said vibration detecting means, so as to monitor a current grinding condition of the wheel.

25. A grinding wheel for grinding a workpiece, comprising:
a core portion connected to a drive shaft;
an abrasive portion fixed to an outer circumferential surface of said core portion for grinding said workpiece;
temperature sensing means disposed in said core portion, for sensing a wheel temperature at a portion close to said abrasive portion, during a grinding operation of said abrasive portion, so as to produce a temperature signal indicative of said wheel temperature; and
temperature signal transmitting means disposed in said core portion, for transmitting in the air said temperature signal from said temperature sensing means, so as to monitor a current grinding condition of the wheel.

* * * * *